United States Patent [15] 3,676,477
Chay et al. [45] July 11, 1972

[54] ESTERS OF PENTAVALENT AND TRIVALENT ANTIMONY WITH A POLYHYDROXY COMPOUND AND THE PROCESS FOR MAKING THE SAME

[72] Inventors: Dong M. Chay; Charles Carmen Cumbo; Michael J. Randolph; Paul C. Yates, all of Wilmington, Del.

[73] Assignee: E. I. du Pont de Nemours and Company, Wilmington, Del.

[22] Filed: Nov. 30, 1970

[21] Appl. No.: 93,834

[52] U.S. Cl. ............................. 260/446, 252/8.1, 260/32.6
[51] Int. Cl. ............................................................. C07f 9/90
[58] Field of Search ........................................... 260/446

[56] References Cited

UNITED STATES PATENTS

| | | | |
|---|---|---|---|
| 2,993,924 | 7/1961 | Marks et al. | 260/446 |
| 3,035,076 | 5/1962 | Gailliot et al. | 260/446 |
| 3,109,853 | 11/1963 | Worsley et al. | 260/446 |
| 3,288,830 | 11/1966 | Stallings et al. | 260/446 |
| 3,317,576 | 5/1967 | Malz et al. | 260/446 |
| 3,437,591 | 4/1969 | Bungs | 260/446 |
| 3,455,995 | 7/1969 | Bowman et al. | 260/446 X |
| 3,440,259 | 4/1969 | Bungs | 260/446 |

*Primary Examiner*—Tobias E. Levow
*Assistant Examiner*—Werten F. W. Bellamy
*Attorney*—Don M. Kerr

[57] ABSTRACT

Esters of pentavalent antimony ($Sb^{+5}$) with polyhydroxy compounds having vicinal hydroxyl groups, and mixed esters composed of these pentavelent antimony esters in combination with trivalent antimony ($Sb^{+5}$) esters of polyhydroxy compounds having vicinal hydroxyl groups, which can be made by a process involving reacting antimony trioxide ($Sb_2O_3$) with a polyhydroxy compound having vicinal hydroxyl groups and hydrogen peroxide to oxidize at least a portion of the antimony to the pentavalent state. By removing substantially all of the water of reaction there can be produced a pentavalent antimony ester in which four of the valences of the antimony are satisfied by ester linkages through the hydroxyl groups of two molecules of the polyhydroxy compound and the fifth valence of the antimony is satisfied by an ester linkage through a vicinal hydroxyl group of a third molecule of the polyhydroxy compound. The products of the invention are soluble in polar organic solvents customarily used in processing organic polymers and can therefore be conveniently incorporated into polymers to provide increased flame resistance.

26 Claims, No Drawings

ESTERS OF PENTAVALENT AND TRIVALENT ANTIMONY WITH A POLYHYDROXY COMPOUND AND THE PROCESS FOR MAKING THE SAME

BACKGROUND OF THE INVENTION

Glycerine and glycol esters of trivalent antimony are known. Such compounds have been incorporated into polymers to give improved flame resistance. These compounds, however, are not sufficiently soluble at ordinary temperatures in the polar organic solvents commonly used to dissolve polymers for casting or spinning, and therefore cannot be conveniently incorporated into films or fibers of the polymers.

SUMMARY OF THE INVENTION

This invention provides antimony esters with polyhydroxy compounds which are soluble in polar organic solvents ordinarily used for processing organic polymers, and which can therefore be conveniently incorporated into the polymers prior to processing to enhance flame resistance of articles made therefrom.

In one aspect this invention is a process for making a pentavalent antimony ester or a mixed ester of pentavalent and trivalent antimony with an aliphatic polyhydroxy compound containing two through six carbon atoms and having vicinal hydroxyl groups, involving reacting trivalent antimony oxide with a polyhydroxy compound of the type specified and hydrogen peroxide to oxidize at least 20 mole percent of the antimony to the pentavalent state. The reaction can be carried out by adding hydrogen peroxide to either (1) a slurry of antimony trioxide in the aliphatic polyhydroxy compound or (a solution of an ester of trivalent antimony with the polyhydroxy compound. In the mixed esters the pentavalent antimony esters solubilize the trivalent antimony esters in various polar organic solvents commonly used for processing of polymers. The amount of hydrogen peroxide used should be sufficient to convert at least one fifth and preferable at least one third of the antimony to the pentavalent state in order to provide a product which is sufficiently soluble to be useful for solvent incorporation into organic polymers. In other words, the product should contain no more than a fourth-fold mole ratio, preferably no more than a two-fold mole ratio of trivalent antimony to pentavalent antimony. With higher ratios, the products are not sufficiently soluble in polar organic solvents such as dimethylformamide and dimethylsulfoxide.

In the above process water is produced in both the esterification and oxidation steps. It has been discovered that if this water of reaction is thoroughly removed there can be produced an ester of pentavalent antimony in which four of the five valences of the antimony are satisfied by ester linkages between the antimony and the vicinal hydroxy groups of two molecules of the polyhydroxy compound and the fifth valence of the antimony is satisfied by an ester linkage between the antimony and a vicinal hydroxyl group of a third molecule of the polyhydroxy compound, or a mixed ester composed of an ester of pentavalent antimony as described, in combination with an ester of trivalent antimony with the polyhydroxy compound in which two of the valences of the trivalent antimony are satisfied by an ester linkage between the antimony and the vicinal hydroxy group of a single molecule of the polyhydroxy compound and the third valence of the trivalent antimony is satisfied by an ester linkage between the antimony and a vicinal hydroxyl group of a second molecule of the polyhydroxy compound. The invention therefore includes the esters and mixed esters as just described and the process for making them as well as mixed esters formed by mixing a solution of an ester of pentavalent antimony of the type just described with a solution of an ester of trivalent antimony with the polyhydroxy compound containing two through six carbon atoms and having vicinal hydroxyl groups. In all of the mixed esters of this invention the mole ratio of trivalent and pentavalent antimony is less than 4:1.

The novel pentavalent antimony esters of this invention can be obtained as substantially pure crystalline compounds by continuing the oxidation step of the process until at least about 60 mole percent of the antimony is oxidized to the pentavalent state and removing water of reaction and excess polyhydroxy compound by distillation under reduced pressure. The pentavalent antimony esters of the invention are less soluble in polyhydroxy compounds than the mixed esters of the invention and therefore crystallize preferentially as the solution is concentrated. The distillation is continued until a slurry of the solid pentavalent antimony ester in the remaining polyhydroxy compound or mixed ester/polyhydroxy compound solution is obtained. The pentavalent antimony ester is then recovered by filtration.

Certain of the novel pentavalent antimony esters of this invention can be represented by the following structural formula:

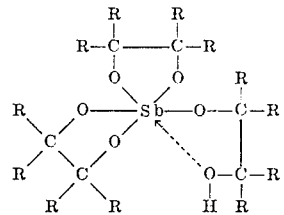

wherein
each R is selected from the group consisting of hydrogen, alkyl of one through four carbon atoms, and hydroxy alkyl of one through four carbon atoms, with the proviso that the total number of carbon atoms in the R groups attached to any two bonded carbon atoms does not exceed four. A particularly preferred product of the invention is a solid crystalline pentavalent antimony ester with ethylene glycol in which the mol ratio of ethylene glycol to antimony is 3:1. This product can be represented by the following structural formula:

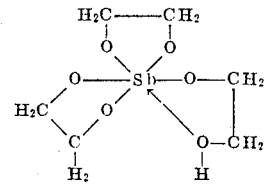

Also preferred are pentavalent antimony esters of the invention wherein the polyhydroxy component is glycerol.

In another aspect this invention includes solutions of the novel pentavalent antimony esters and mixed pentavalent/trivalent antimony esters of the invention in polar organic solvents which have a dielectric constant measured at 25° C. and $10^4$ to $10^5$ cycles per second (cps) greater than 35 electrostatic units (ESU) and a ratio of carbon atoms to heteroatoms less than 1.7. Examples of suitable solvents which fit these characteristics include formic acid, formamide, methylformamide, dimethylformamide, acetamide, ethylene glycol, glycerol, diethylene glycol, 1,3-propanediol, 1,2-propanedial, dimethylsulfoxide, and their mixtures.

In another aspect the invention includes shaped articles, e.g., films, fibers and foams of synthetic organic polymers which contain one or more esters or mixed esters of this invention in an amount sufficient to provide enhanced flame resistance to the article. Polymers contemplated are those which are soluble in one or more of the above polar organic solvents including for example: acrylonitrile polymers, such as polyacrylonitrile, copolymers of acrylonitrile and vinyl halides, copolymers of acrylonitrile and vinylidene halides; polyamides; polyesters; polyacrylates; polyurethanes; vinyl chloride polymers, such as polyvinyl chloride and polyvinyl acetate; an acrylonitrile-butadiene-styrene copolymers. Particularly preferred are polymeric articles containing the pentavalent antimony esters of ethylene glycol and glycerol.

DESCRIPTION OF THE INVENTION

Process of the Invention

The polyhydroxy compounds used in the process of the invention are those containing two through six carbon atoms and having vicinal hydroxyl groups. Examples of suitable aliphatic polyhydroxy compounds include ethylene glycol, glycerol, 1,2-propanediol, 1,2-butanediol, and 2,3-butanediol. Especially preferred are ethylene glycol and glycerol. The antimony trioxide can be commercial $Sb_2O_3$ powder which is of the cubic crystal structure. Antimony trioxide with a cubic crystal structure is preferred over the orthorhombic because it reacts much more rapidly with the polyhydroxy compound. The oxide is added to an excess of the polyhydroxy compound. Polyhydroxy compound is used in sufficient excess to serve as the reaction solvent. This mixture is agitated and heated to a temperature in the range of about 125° to 240° C. in order to cause part of the $Sb_2O_3$ to react with the polyhydroxy compound forming an ester of trivalent antimony with the polyhydroxy compound and liberating water. The rate of the reaction of the $Sb_2O_3$ and polyhydroxy compound is influenced by the temperature and water content of the slurry. At high temperatures the $Sb_2O_3$ reacts more rapidly, but the polyhydroxy compounds decompose and colored by-products are formed. A temperature of below 180° C. is preferred. The water formed in reaction is normally removed by distillation during the reaction. If is not removed, the reaction will stop as an equilibrium between the oxide and trivalent antimony ester is reached.

Hydrogen peroxide preferably as an aqueous solution is added to the reaction mixture to oxidize at least a portion of the antimony to the pentavalent state. It is necessary to add at least one mole of hydrogen peroxide for each mole of $Sb^{+5}$ it is desired to produce.

The reaction of the peroxide with the trivalent antimony takes place at temperatures from 25° C. to above 200° C. For practical purposes the preferred range of temperatures is from 90° to 200° C. Temperatures below 90° C. result in reduced solubility of the antimony esters in the polyhydroxy compounds and in increased difficulty of water removal. Operation above 200° C. in undesirable because of thermal instability of the pentavalent antimony esters. At 230° C. the compounds decompose completely in just a few minutes. When the compounds decompose the pentavalent antimony is reduced to trivalent antimony. Below 200° C. the rates of decomposition are such that the compounds can be made and handled. It is preferred to carry out the reaction below 170° C. where high utilization of the hydrogen peroxide can be obtained.

If hydrolysis of the intermediate and product esters is to be prevented, it may be necessary to remove the water from the reaction mass. This can be done by either alternate additions and distillations or by continuous distillation during the addition. The fact that it is possible to distill water and polyhydroxy compound from the reaction during the hydrogen peroxide addition is evidence that the reaction is very rapid. If the peroxide did not react very rapidly it would be removed with the water since it is more volatile than ethylene glycol, but less than one percent of total peroxide charged is found in the distillate.

The first reaction of $Sb_2O_3$ with ethylene glycol is not essential. The hydrogen peroxide can be added to a slurry of $Sb_2O_3$ in polyhydroxy compound to convert the $Sb_2O_3$ to pentavalent antimony oxide or hydroxide. After the oxidization the pentavalent antimony oxide or hydroxide can be esterified by reaction with the polyhydroxy compound. In the oxidation step it is desirable to have an excess of $Sb^{+3}$ in solution over the amount of hydrogen peroxide added so that the concentration of free peroxides will not build up in the solution, posing a possible hazard.

The concentrations at which the oxidation and esterification reactions are performed are not of major importance. From a practical standpoint, it is desirable to perform the reactions in a concentrated solution so that the reactor volume will be kept at a minimum for a fixed production rate. It is preferred to operate below the saturation point of the esters in the solution. The saturation point will depend on the particular polyhydroxy compound and the ratio of the trivalent and pentavalent antimony esters in solution and the temperature of the solution. For instance, when the polyhydroxy compound is ethylene glycol the solubility at 160° C. of the trivalent antimony ester is about 20 percent and of the pentavalent antimony ester is about 15 percent and mixtures of the two have higher solubilities. These high solubilities make it possible to react in highly concentrated solutions when using ethylene glycol.

If it is desired to make a pentavalent antimony ester or a mixed pentavalent/trivalent antimony ester in which all valences of the antimony are satisfied by ester linkages between the antimony and vicinal hydroxy groups of the polyhydroxy compound it is necessary to remove substantially all of the water liberated in the esterification and oxidation reactions, preferably by reduced pressure distillation. If the water is not removed the reaction will stop as an equilibrium between the antimony oxide and an antimony ester in which only a portion of the valences are satisfied by ester linkages between the antimony and vicinal hydroxyl groups of the polyhydroxy compound.

If it is desired to make a crystalline $Sb^{+5}$ ester of an aliphatic diol having vicinal hydroxyl groups and containing two through six carbon atoms, it is necessary to convert at least 60 percent and preferably at least 80 percent of the antimony to the pentavalent form, and also to remove most of the water, preferably by vacuum distillation. The esters of triols do not crystallize from concentrated solutions when the solvent is the triol. Preferably the solution produced is concentrated by reduced pressure distillation of polyhydroxy compound at a temperature of below 180° C., preferably below 160° C., to hold decomposition of the pentavalent antimony ester to a minimum. As the excess polyhydroxy compound is removed, the pentavalent antimony ester crystallizes preferentially. The yield of crystalline pentavalent esters is highest when as much polyhydroxy compound is removed by vacuum distillation as is possible without exceeding the temperature limitation above. When ethylene glycol is used it is possible to remove all but a portion corresponding to about 30 percent of the antimony ester by weight. However, it is not necessary to remove this much glycol to crystallize some of the pentavalent antimony ester. If the ratio of trivalent and pentavalent antimony ester is greater than one half, little or no crystallization will occur, because the $Sb^{+3}$ ester increases the solubility of $Sb^{+5}$ ester. The maximum yield of $Sb^{+5}$ ester is obtained from crystallization when all of the antimony is converted to the pentavalent state. It is therefore necessary to obtain high conversions to pentavalent antimony if high crystallization yields are to be obtained.

If it is desired to isolate the crystals by filtration this may be done directly or the slurry of the pentavalent antimony ester in the polyhydroxy compound may be diluted with tetrahydrofuran to make the filtration more rapid. Tetrahydrofuran has several properties which make it ideally suited for this purpose: ethylene glycol is soluble in it, the mixed $Sb^{+5}$ and $Sb^{+3}$ esters are soluble in it, the pure $Sb^{+5}$ ester has a low solubility in it, it has a high volatility which allows it to be dried from crystals easily, and it does not react with the products. Other low boiling solvents such as acetone, methanol, ethanol, ethyl ether, and chloroform are lacking one or more of the above properties.

Another method of making pentavalent antimony esters of polyhydroxy compounds of this invention is by ester interchange. A pentavalent ester, made as described above, of a lower boiling polyhydroxy compound or of a low boiling alcohol such as ethanol, prepared by a known method, is added to an excess of the desired polyhydroxy compound. The mixture is then heated to 100° to 160° at which point the ester dissolves. The lower boiling polyhydroxy compound is then removed by distillation, and the remaining solution of the pentavalent antimony ester of the higher boiling polyhydroxy compound is treated as it would be if made directly by the hydrogen peroxide route.

COMPOSITIONS OF THE INVENTION

The novel compositions of the invention are pentavalent antimony esters and mixed pentavalent/trivalent antimony esters with polyhydroxy compounds containing two through six carbon atoms and having vicinal hydroxy groups. In both the esters and mixed esters four of the valences of the pentavalent antimony are satisfied by ester linkages between the antimony and the vicinal hydroxyl groups of two molecules of the polyhydroxy compound and the fifth valence of the antimony is satisfied by an ester linkage between the antimony and a vicinal hydroxy group of a third molecule of the polyhydroxy compound. In the mixed esters two of the valences of the trivalent antimony are satisfied by ester linkages between the antimony and one molecule of the polyhydroxy compound and the third valence is satisfied by an ester linkage between the antimony and a vicinal hydroxyl group of a second molecule of the polyhydroxy compound. In the mixed esters the ratio of trivalent to pentavalent antimony is less than 4:1 and is preferably less than 2:1. There is no lower limit to this ratio since the process is capable of producing essentially pure pentavalent antimony ester. However, at a ratio of say 1:99 the mixed ester (more accurately, the mixture of mixed ester and pentavalent antimony ester) is not significantly different from the pure pentavalent antimony ester.

Pentavalent antimony esters of the invention can be represented by the following structural formula

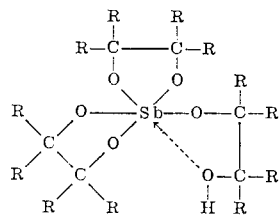

wherein each R is selected from the group consisting of hydrogen, alkyl of one through four carbon atoms, and hydroxy-alkyl of one through four carbon atoms, with the proviso that the total number of carbon atoms in the R groups attached to any two bonded carbon atoms does not exceed four. It should be noted that pentavalent antimony tends to be six-coordinated. In the novel compositions of the invention five of the six coordination positions are satisfied by covalent bonds between the antimony and oxygen of the vicinal hydroxyl groups of the polyhydroxy compound. The sixth-coordination site can be satisfied by a complexing molecule containing an electron donating atom such as oxygen or nitrogen. Because of the environment in which they are formed, the complexing molecules will ordinarily be water or a molecule of the polyhydroxy compound but it can also be an alcohol, especially a lower aliphatic alcohol, or other substance capable of forming a coordinate bond with the antimony. Further, the sixth-coordination position can be satisfied by coordination with the oxygen atom of the unreacted hydroxyl group of the third molecule of polyhydroxy compound as indicated by the dotted arrow in the above structural formula. Elemental analyses and spectral data indicate that the sixth-position is ordinarily satisfied by coordination with the oxygen of the hydroxyl group of the third molecule of polyhydroxy compound in case of the isolated crystalline pentavalent antimony esters of the invention. For example the NMR spectrum of a solution of a pentavalent antimony ester of ethylene glycol in dimethyl formamide shows a singlet at 3.7 delta ($\delta$), where $\delta$ in parts per million is defined by the equation:

$$\delta \text{ (p.p.m.)} = \frac{\Delta \times 10^6}{\text{Oscillator frequency, c./s.}}$$

where $\Delta$ is the distance of the absorption peak from that of tetramethylsilane in cycles per second (c/s), as compared with 3.57$\delta$ for a solution of ethylene glycol. This observed $\delta$-shift is consistent with the formation of ester linkages with all five of the antimony valences. The elemental analysis for this compound is consistent with an ethylene glycol to antimony mole ratio of 3:1 and the absence of any other absorption peak is consistent with the formation of a coordinate bond between the oxygen atom of the second hydroxyl group of the third molecule of ethylene glycol. Thus, this preferred compound of the invention can be represented by the structural formula

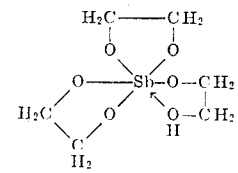

However, it is emphasized that the invention is not limited to compounds in which the sixth coordination site of the pentavalent antimony is satisfied by coordination with the oxygen atom of a vicinal hydroxyl group of a third molecule of polyhydroxy compound. The manner in which the sixth position is satisfied is not critical. Compounds such as

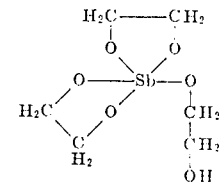

wherein the sixth coordination site is satisfied by another complexing molecule are within the scope of the invention.

It is thought that the "mixed esters" of this invention are not mere physical mixtures of esters of trivalent antimony with esters of pentavalent antimony because the products are soluble to an appreciable extent in polar organic solvents such as dimethyl formamide and dimethyl sulfoxide, whereas the trivalent antimony esters have very low solubilities in these solvents. The esters of trivalent antimony with polyhydroxy compounds are more basic than the acidic esters of pentavalent antimony so the two species may form a salt which is more soluble in polar organic solvents than the trivalent antimony species alone. When esters of trivalent antimony are formed with polyhydroxy compounds such as ethylene glycol or glycerol, the possibility exists for the formation of polymers in which one hydroxyl of the polyhydroxy compound is esterified with one trivalent antimony atom while a second is esterified with a different trivalent antimony atom. In this manner, it is believed that bridges can be formed between two or more trivalent antimony atoms and thus low molecular weight polymers of trivalent antimony may occur. Such polymeric species may then form salts with the acidic pentavalent antimony esters. Alternatively, one or more of the antimony atoms in the polymeric species may be oxidized to the pentavalent state upon addition of hydrogen peroxide resulting in a polymer species containing both $Sb^{+3}$ and $Sb^{+5}$. A possible structure for such a species would be

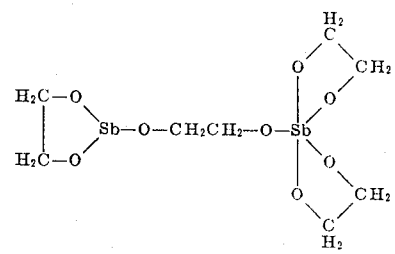

It will be noted that the above structure requires that all valences of antimony are satisfied by an ester linkage with one of the vicinal hydroxyl groups of the polyhydroxy compounds. Alternative structures can involve a larger number of moles of polyhydroxy compound per antimony, for example in a salt structure rather than a bridged dimer.

The invention includes solutions of one or more of the above-described pentavalent antimony esters and/or mixed pentavalent antimony-trivalent antimony esters in polar aliphatic organic solvents having high dielectric constants. In general, the solvents which can be used are organic acids, amides, polyalcohols, and dimethylsulfoxides. Suitable solvents are characterized by a dielectric constant of the solvent measured at 25° C. and $10^4$ to $10^5$ cycles per second which exceeds 35 electrostatic units (ESU) and the ratio of carbon atoms in the solvent to hetero atoms such as oxygen, nitrogen, and sulfur which is less than 1.7. Suitable solvents include formic acid, formamide, methylformamide, dimethylformamide, acetamide, ethylene glycol, glycerol, diethylene glycol, propane diols, such as 1,3-propane diol, and dimethylsulfoxide. Surprisingly, it is found that a variety of other polar solvents which do not simultaneously satisfy these criteria in regard to carbon to hetero atom ratio and dielectric constant are not good solvents for the esters of this invention. For example, solvents such as ethanol, methanol, tetramethylurea, dimethylacetamide, acetonitrile, acetic acid, furfural, and methyl formate are not satisfactory solvents for esters of the invention.

Solvents should be substantially anhydrous and contain not more than one percent water and preferably not more than 0.1 percent water. Free water, if present in substantial amounts, can cause hydrolysis of the esters of the invention or of the solvent in the presence of the acidic esters. This is particularly true of solvents such as formamide and methylformamide which hydrolyze easily in the presence of water and of acidic catalysts. In preparing solutions of the esters of the invention is is therefore desirable to remove excess water by distillation, displacement with alcohols, or other suitable means, before mixing the esters of the invention with the solvent. Such techniques will be illustrated in greater detail in examples of this invention which follow.

The most preferred solvents are those which are also good solvents for organic polymers such as dimethylformamide and dimethylsulfoxide which are excellent solvents for acrylonitrile polymers, such as polyacrylonitrile and copolymers of acrylonitrile with vinyl and vinylidene halides. Also preferred are solvents for polyamide polymers such as 66 nylon which include formic acid, formamide and mixtures of formamide with formic acid. Solvents which dissolve polyesters at high temperature are also preferred solvents of the invention and these include ethylene glycol, glycerol, and diethylene glycol. It has been found that the total amount of antimony in the form of the esters of the invention which can be dissolved in a polar organic solvent depends on the ratio of $Sb^{+3}$ to $Sb^{+5}$. While it is possible to prepare soluble compositions having a mole ratio of $Sb^{+3}$ to $Sb^{+5}$ as high as 4:1, somewhat lower ratios are preferred because of their solubility, but at ratios below about 1:3 the solubility decreases with increasing $Sb^{+5}$ content. However the $Sb^{+5}$ esters are sufficiently soluble to give solutions of the invention.

In another aspect the invention includes flame resistant shaped articles of organic polymers containing the esters and/or mixed esters of the invention and a method for the preparation of such articles. The shaped articles may be in the form of fibers, films or foams made from polymers such as acrylonitrile polymers (e.g., polyacrylonitrile, copolymers of acrylonitrile with vinyl halides and copolymers of acrylonitrile with vinylidene halides) polyamides, polyesters, polyacrylates, polyurethanes, vinyl chlorides (e.g., polyvinyl chloride, and copolymers of vinyl chloride and vinyl acetate) and acrylonitrile-butadiene-styrene copolymers. The term "copolymer" as used herein is intended to include polymers containing two or more monomeric species. A solution of the ester or mixed ester is merely mixed with a solution of the polymer in a compatible, preferably the same, solvent. The polymer can then be processed in a conventional manner to make shaped articles. Thus, the solution can be used directly for solution-spinning of fibers, or casting of films of polymers such as polyacrylonitrile which are conventionally processed in this manner. Alternatively, the solvent can be removed and the polymer containing the ester or mixed esters of the invention can be melt extruded to form rods, pellets, fibers, foams or films, or molded to form other articles. The amount incorporated into the polymer will vary somewhat with the nature of the polymer and the degree of flame resistance required, but will generally range between 0.5 and 30 percent, preferably between 0.5 and 20 percent, calculated as $Sb_2O_5$, by weight of the polymer. Loadings below 0.5 percent are often insufficient to achieve substantial improvements in flame resistance, while amounts in excess of 20 percent are usually not required, even with polymers most susceptible to burning.

Generally polymers containing organic halogens either as a copolymer or as an additive, such as polyvinyl chloride, tetrabromophthalic anhydride, chlorinated or brominated waxes and terpenes, respond most favorably to the antimony compounds of the invention presumably because of the formation of volatile antimony halides and oxyhalides which interfere with flame propagation by trapping free radicals. For this reason, smaller amounts of antimony compounds are required when used in conjunction with organic halogens and highly flame resistant polymers can be prepared having only a few percent of the antimony esters of the invention.

The most preferred range is from 1 percent to about 10 percent by weight of the polymer calculated as $Sb_2O_5$ in the composition when organic halogens are present, and from about 5 to 19 percent in the absence of organic halogens.

The esters and mixed esters of the invention are compatible with the synthetic organic polymers which have been mentioned. This is important because it allows the products to maintain an almost molecular state of sub-division and dispersion as the solvent is eliminated from the polymer during processing. Thus, the products do not deluster films and fibers of polymers into which they are incorporated nor do they interfere seriously with the mechanical properties of such polymers. Because of the fine state of sub-division maintained as a result of this compatibility, the products of the invention are highly active on a unit weight basis, and thus excel over prior art sources of antimony as flame proofing materials. For example, it has often been customary in the art to incorporate large particles size antimony oxide, antimony sulfide, and similar insoluble compounds into organic polymers. The large particle size of such prior art materials not only causes delustering and pluggage of spinnerets and filter packs but also leads to relatively low efficiency as flame retardants sine generally only the surface atoms in a large particle can participate in chemical reactions which enhance flame resistance.

The products of the invention possess a very useful balance between excessive water sensitivity and permanence. Many compositions known in the prior art possess an undue sensitivity to water. Examples include simple pentavalent esters of antimony with lower alcohols such as antimony pentamethoxide or pentaethoxide. Such compositions are so water sensitive that unless even the most minute traces of moisture are absent they cannot be processed without hydrolysis followed by substantial particle growth, which in turn leads to delustering, difficulties in spinning, and lowered efficiency as flame-proofing agents. The glycol and glycerol esters of trivalent antimony known in the prior art are also quite water sensitive. On the other hand some antimony compounds are so stable with respect to water than they can actually be dissolved in water and extracted from the organic polymer. Since the organic polymer, fiber or film very often must be processed in the presence of large amounts of water, antimony compounds which cannot be hydrolyzed at all by water but are soluble in water often are not suitable as permanent flame retardant treatments. For example, in the processing of acrylonitrile polymers and copolymers one process involves spinning from a dimethylformamide solution with a partial evaporation of solvent followed by an extraction of the remainder of the solvent by a simultaneous washing and drawing operation in 100° C. water bath. Since the fiber at this point still contains 30 percent solvent, any water-soluble species sufficiently stable against hydrolysis to be extracted is likely to be removed by such a treatment. Even in polymer systems which are not subjected to this kind of processing other operations involve extended immersion in hot aqueous solutions. These include washing and scouring operations which are encountered not only in processing but in the end use of the fiber or fabric.

Compounds of this invention are sufficiently stable to avoid premature hydrolysis due to traces of water during processing on one hand but on the other hand they can be hydrolyzed or solubilized on exposure to aqueous solutions such as in the wash/draw operation of acrylonitrile polymers discussed above. The extent to which the products of the invention hydrolyze depends on the particular product and on conditions. However the antimony-containing hydrolysis products are in an extremely fine size range such that these particles do not scatter light and thus do not lead to delustering of the fiber. Because the particle size of the hydrolysis products in so fine they also maintain high efficiency characteristic of a molecular or near molecular state of sub-division. Since the antimony oxide and hydrous oxide resulting from the hydrolysis is quite insoluble in aqueous solutions, the compositions of this invention are not extracted from the fiber once incorporated therein and give a very permanent flame proofing treatment even after repeated exposure to hot-water process and normal use conditions.

Some illustrative examples of the manner of making and using this invention are given below. In the examples parts and percentages are by weight unless otherwise stated.

EXAMPLE 1

Antimony ethylene glycol ester is made from antimony trioxide, ethylene glycol, and hydrogen peroxide by the following procedure: 145.7 grams of antimony trioxide (0.5 mole) and and 900.0 grams of ethylene glycol are added to a 1 liter round bottom flask equipped with a mechanical stirrer and thermometer. This is attached to a vacuum distillation apparatus. The reactants are then heated to 180° C. and stirred as vacuum is applied to bring the slurry to a boil. As the antimony trioxide and ethylene glycol react, water is liberated which is removed by vacuum distillation. A total of about 125 grams of distillate are removed containing 27 grams of water (1.5 moles), the remainder being ethylene glycol. The product of this reaction is a solution of antimony ethylene glycol ester in trivalent state.

The solution is then cooled to about 160° C. and a dropping funnel containing 112.0 grams of 30.4 percent hydrogen peroxide aqueous solution (1 mole) is attached to the reactor. The system is evacuated to a pressure of 265 ± 10 torr. and hydrogen peroxide is added dropwise over a 2-hour period. During this addition the solution is heated and water is removed by vacuum distillation together with 4 parts of ethylene glycol per part of water. The temperature of the solution is 160° to 170° C. at 265 ± 10 torr. The resulting solution contains pentavalent antimony ethylene glycol ester dissolved in the excess glycol. Excess ethylene glycol is removed by vacuum distillation until the residue is 380 grams. The temperature of the solution is maintained between 160° to 170° C. by lowering the pressure.

As the last of the ethylene glycol is removed the antimony ethylene glycol ester crystallizes from the solution. At this point 500 grams of dimethylformamide are added to the slurry and a solution is formed. One hundred and forty grams of dimethylformamide with any remaining traces of water are removed by vacuum distillation at pressure of 38 torr. and a temperature of about 75° C. The solution is then diluted with dimethylformamide to about 1,300 grams total weight. It is then filtered with filter aid to remove a small amount (about 1 gram) of unreacted antimony oxide. The material is the orthorhombic crystal structure of $Sb_2O_3$.

The resulting product is a clear colorless solution of the pentavalent antimony ethylene glycol ester with a small amount of excess ethylene glycol in dimethylformamide. The solution contains 8.5 percent antimony, as determined by atomic absorption analyses.

EXAMPLE 2

Antimony ethylene glycol ester containing a mixture of 60 percent antimony in the pentavalent state and 40 percent in the trivalent state is made by the following procedure: 179.6 grams of antimony trioxide (0.62 moles) is reacted with 850.0 grams of ethylene glycol as in Example 1. The antimony in solution is then oxidized as before, using only 82.8 grams of 30.4 percent hydrogen peroxide solution (0.740 moles $H_2O_2$). Excess glycol is removed by vacuum distillation at a pressure of about 140 torr. and a temperature of 135° to 150° C. until the residue is 400 grams. None of the compounds crystallize from the solution. Dimethylformamide is then added and the solution is treated as in Example 1. The solution is diluted so that the final weight is 890 grams.

The resulting product is a clear colorless solution of antimony ethylene glycol esters with a small amount of ethylene glycol in dimethylformamide. The solution contains 17.0 percent antimony as determined by atomic absorption and 58 percent of the antimony is in the pentavalent state, as determined by dissolving in HCl, adding potassium iodide, and titrating the liberated iodine, with sodium thiosulfate. (Details of the analytical procedure are given in *Scotts Standard Methods of Chemical Analyses*, published by D. Van Nostrand & Co., Inc., Princeton, N.J., pp. 75–76, 1939.)

EXAMPLE 3

This example describes the preparation of a pentavalent antimony-ethylene glycol ester by boiling antimony trioxide in glycol containing hydrogen peroxide.

Six grams of commercial $Sb_2O_3$ powder is added to 94 grams of ethylene glycol with agitation in b beaker. The slurry is then heated in air, the temperature being increased at about 5° C. per minute to the boiling point, 197° C. A slightly turbid solution is obtained, and to 95 grams of the solution at 190° C. hydrogen peroxide (30.4 percent) is then added, in 2 gram increments continuing boiling for a further 5 minutes with agitation, until a total of 14 grams of hydrogen peroxide is added.

The resulting solution of antimony-ethylene glycol ester in ethylene glycol is slightly viscous and pale brown in color at room temperature. It contains 4.60 percent antimony as determined by atomic absorption spectroscopic analysis, and all the antimony is in the pentavalent state as shown by titration, as described in Example 2.

The solution is miscible with DMF and has at least 2 month's storage stability at room temperature. Films cast from a dimethylformamide solution of a mixture of above solution and acrylonitrile copolymerized with vinylidene chloride are clear and highly resistant to burning even after boiling in water for an hour.

EXAMPLE 4

This example describes the preparation of crystalline pentavalent antimony ethylene glycol ester from antimony trioxide, ethylene glycol, and hydrogen peroxide. Seven hundred and ninety grams of H grade antimony trioxide supplied by the McGean Chemical Company of Cleveland, Ohio (5.43 moles of $Sb^{+3}$) and 3,750 grams of ethylene glycol are added to a 5 liter round-bottom flask equipped with dropping funnels, a mechanical stirrer, vacuum distillation apparatus, and a thermometer. The pressure of the system is reduced to 216 torr. and the slurry is heated vigorously. When the temperature reaches about 150° C., the solution begins to boil, liberating the water formed in the reaction of the ethylene glycol and the antimony trioxide. After about 45 minutes, 200 ml. of distillate are collected and the temperature rises to 160° C. At this point about one-third of the $Sb_2O_3$ is reacted.

The pressure of the system is reduced to 190 torr. and the dropwise addition of a 30.2 percent solution of hydrogen peroxide is started. Five hundred and thirty-six grams (4.75 moles $H_2O_2$) of hydrogen peroxide are added over a 3 hour, 15 minute period. During this period the water is removed continuously by distillation with about 4 parts of ethylene glycol per part water. This distillate contains about 100 ppm $H_2O_2$. Ethylene glycol is added to maintain the weight of the solution at about 4,000 grams. As the $H_2O_2$ is added and reacts, more $Sb_2O_3$ reacts and goes into solution. After about 60 percent of the peroxide is added, the solution clears. The temperature of the solution remains between 145° and 150° C.

The procedure requires no filtration as is needed in Examples 1 and 2 because the starting antimony oxide contains essentially no orthorhombic $Sb_2O_3$. If the starting $Sb_2O_3$ contains orthorhombic crystals, filtration at this point is necessary to remove this material, which will remain undissolved.

After this part of the addition is completed the solution is analyzed for $Sb^{+3}$. The method is a potentiometric titration with a bromide-bromate solution of the sample dissolved in hydrochloric acid. The end point is determined by sudden increase in the potential of a platinum-calomel electrode system. The solution of mixed $Sb^{+3}$ and $Sb^{+5}$ ethylene glycol esters is found to contain 156 grams of $Sb^{+3}$ (1.27 moles). Thus, 4.16 moles of the starting $Sb^{+3}$ are converted to $Sb^{+5}$ by 4.75 moles of hydrogen peroxide, a 87.5 percent utilization of peroxide. An additional 143 grams of 30.2 percent hydrogen peroxide (1.27 moles) is now added in a similar manner as the first portion. The solution is again analyzed and found to contain 70.5 gm. of $Sb^{+3}$ (.63 mole). A 50 percent utilization of the peroxide is obtained in the second addition.

Finally, to complete the additions, the solution is cooled to 110° C. and 70 grams of peroxide solution are added over a 1-minute period at atmospheric pressure. After 2 minutes the solution temperature is 122° C. This step converts about 70 percent of the remaining $Sb^{+3}$ to $Sb^{+5}$.

Now the water and some excess ethylene glycol are removed by vacuum distillation. The pressure is gradually reduced to 5 torr. and the solution temperature is about 100° C. When the weight of solution is reduced to about 3,500 gm. the $Sb^{+5}$ ethylene glycol ester begins to crystallize from the solution. Excess glycol is removed until the solids content of the slurry is so high that stirring is difficult. The weight of the slurry is 2,220 grams, and its temperature is now about 120° C.

The vacuum is released and 1,200 ml. of tetrahydrofuran are added to dilute the slurry so that it may be filtered easily. The crystals are then recovered by filtration under a blanket of dry nitrogen. The wet crystals are then washed with 2.5 liters of tetrahydrofuran and dried at room temperature with a stream of dry nitrogen. Fourteen hundred and sixty-nine grams of pentavalent antimony ethylene glycol ester are obtained. When titrated as described in Example 2, this product is found to contain 40.5 percent $Sb^{+5}$, and when titrated as above for $Sb^{+3}$ it contains less than 0.025 percent. Elemental analysis of the crystalline compound gives 40.6 percent antimony, 23.9 percent carbon, 4.34 percent hydrogen. The theoretical composition of the pentavalent antimony ester of ethylene glycol is 40.27 percent antimony, 23.76 percent carbon and 4.29 hydrogen. When 10 grams of the crystals are dissolved in 100 grams dimethylformamide or dimethylsulfoxide a clear, colorless solution is formed.

To complete the material balance the mother liquor is titrated and contains 23.8 grams of $Sb^{+3}$ and 34.5 grams of $Sb^{+5}$. Thus 99 percent of the antimony charged is accounted for and 90.0 percent of it is converted to crystalline pentavalent antimony ethylene glycol ester.

Films of a copolymer of vinyl chloride and acrylonitrile containing 12.5 percent of the above compound are prepared by first dissolving .5 gm. of the crystalline pentavalent antimony ethylene glycol ester and 3.5 grams of the copolymer in 11 grams of dimethyl formamide at 100° C. About one-half of this solution is then spread onto a 3 × 6 inch glass plate and dried in a circulating air oven at 140° C. for 30 minutes. The film is then removed from the plate and found to be clear and lustrous. When tested in a standard 45° angle burning test (Test Method AATCC 33-1962, as described on pages B-139 to B-142 of the AATCC Technical Manual, 1968 Edition, Volume 44, Sept. 1968, published by the American Association of Textile Chemists and Colorists, Research Triangle Park, North Carolina) the film is self-extinguishing.

EXAMPLE 5

Pentavalent antimony glycerol ester can be made from the pentavalent antimony ethylene glycol ester and glycerol by ester interchange. 75.5 grams of crystalline pentavalent antimony ethylene glycol, prepared as in Example 4, are added to 100 grams of glycerol in a 0.5 liter round-bottom flask equipped as in Example 1. The reactants are heated and stirred. When the temperature reaches 100° C. the solution clears. The system pressure is reduced to about 0.8 torr. and the ethylene glycol formed is removed by distillation. When the solution temperature reaches 180° C. and about 62 grams of distillate are collected, the distillation is stopped. One hundred grams of dimethylformamide is then added to make a solution weighing 213 grams and containing 13.8 percent of pentavalent antimony glycerol ester (calculated as Sb).

EXAMPLE 6

An ethylene glycol solution of the mixed pentavalent and trivalent antimony ethylene glycol esters is made from ethylene glycol, antimony trioxide, and hydrogen peroxide by the following procedure: 145.7 grams (1 mole $Sb^{+3}$) of antimony trioxide and 600 grams of ethylene glycol are charged to a 1-liter round-bottom flask equipped as in Example 1. The slurry is heated and the water of reaction is removed by atmospheric pressure distillation along with some of the ethylene glycol. The temperature after the first 2 ml. of distillate are collected is 187° C. Over a period of 45 minutes, 167 grams of distillate, which contains 16.6 percent water (1.54 moles $H_2O$), are removed and the temperature of the resulting mixture is 204° C.

This solution contains a small amount of an intensely black substance which appears as most of $Sb_2O_3$ dissolves. This material appears only if the starting $Sb_2O_3$ contains some orthorhombic $Sb_2O_3$ and it is present in an amount approximately equal to the orthorhombic $Sb_2O_3$ in the starting $Sb_2O_3$.

the solution is now cooled to 170° C. and about 18 grams of 30 percent $H_2O_2$ solution is added to it over a 7-minute period. During this addition, the black color disappears and a light yellow color is observed. About 40 gms. of distillate are now removed by vacuum distillation. The vacuum is now released and 18 more grams of $H_2O_2$ solution are added. This alternating addition and distillation is repeated three times. A total of 56.3 gm. (.5 moles) of $H_2O_2$ is added and 92.7 gms. of distillate removed.

After the last addition the solution is heated and the remaining water is removed by distillation. When 72 ml. of distillate are removed the solution clears somewhat, loses its yellow cast, and the temperature reaches 198° C. When the 100 ml. have been distilled the temperature is 200° C. and the pressure is reduced in order to keep the temperature below 200° C. as 50 more ml. of distillate are removed. A total of 161 grams of distillate are recovered during this step.

This solution of trivalent and pentavalent antimony esters is now filtered to remove the undissolved $Sb_2O_3$; 664.1 grams of solution are obtained after filtration. This solution is found to contain 7.0 percent pentavalent antimony when titrated as in Example 1; 17.6 percent antimony is found in the solution by elemental analysis. Thus 40 percent of the antimony has been converted to the pentavalent state.

EXAMPLE 7

1.1 Parts of a pentavalent antimony ethylene glycol ester in dimethylformamide solution, prepared as in Example 1 and containing 8 percent antimony by analysis, is added to 1.5 parts of polyvinyl chloride dissolved in 10.9 parts of hot dimethylformamide. The clear solution is poured onto a Pyrex plate and dried in a circulating air oven for 30 minutes at 120° C. to give a clear, lustrous film. The film is self-extinguishing in the AATCC 45° angle burning test. A film similarly made from a dispersion of 0.1 parts of a commercial antimony oxide powder (B & A Reagent Grade), in a solution of 1.5 parts of polyvinyl chloride dissolved in 10.9 parts of dimethylformamide is delustered and is inferior in the burning test to the film prepared from the antimony ethylene glycol ester, although the antimony content of the film is similar.

1.1 Parts of a pentavalent antimony ethylene glycol ester in dimethylformamide solution prepared as described above, is added to 1.5 parts of methyl methacrylate and 0.2 parts of powdered Chlorowax 70 (a chlorinated hydrocarbon wax supplied by the Diamond Chemical Co.) dissolved in 10.9 parts of hot dimethylformamide. A clear, lustrous film, prepared as above, is self-extinguishing in the AATCC 45° angle burning test. A film having a similar antimony content, prepared from a dispersion of a commercial antimony oxide powder as described above is delustered and shows inferior flame resistance in the burning test to the film containing the pentavalent antimony glycol ester.

1.1 Parts of a pentavalent antimony ethylene glycol ester in dimethylformamide solution prepared as above are added to 1.5 parts of polystyrene and 0.2 parts of powdered Chlorowax 70 dissolved in 10.9 parts of hot dimethylformamide. A film prepared as above is self-extinguishing in the AATCC 45° angle burning test. A polystyrene film containing a similar amount of antimony added in the form of a commercial antimony oxide powder is delustered and has inferior flame resistance in the burning test to the film containing the pentavalent antimony ethylene glycol ester.

1.1 Parts of a pentavalent antimony ethylene glycol ester in dimethylformamide solution as described above is added to 1.5 parts of an acrylonitrile-butadiene-styrene copolymer and 0.2 parts of Chlorowax 70 dissolved in 10 parts of hot dimethylformamide. The cloudy solution is poured onto a Pyrex plate and dried in a circulating oven for 30 minutes at 120° C. A practically clear, lustrous film prepared as above is self-extinguishing in the AATCC 45° angle burning test A film similarly prepared and containing about the same amount of antimony added in the form of a commercial antimony oxide powder is highly delustered and quite opaque, and is inferior in the flame resistance in the burning test to a film containing the pentavalent antimony ethylene glycol ester.

6.7 Parts of a pentavalent antimony ethylene glycol ester in dimethylformamide solution as described above is added to a mixture of 10 parts of Paraplex P–43 (a maleic anhydride-ethylene glycol-styrene composition supplied by the Rohm & Haas Co.), 1.0 part of powdered Chlorowax 70 and 0.05 parts of benzoyl peroxide at 60° C. The resulting solution is poured onto a Pyrex plate and heated in an oven at 100°–110° C. for about 20 minutes, to polymerize the composition. A clear, lustrous polyester film is obtained, which is self-extinguishing in the AATCC 45° angle burning test.

1.1 Parts of a pentavalent antimony ethylene glycol ester in dimethylformamide solution prepared as described above is added to 1.5 parts of a polyurethane (Helastic LS–13160, supplied by the Wilmington Chemical Corp.) and 0.2 parts of powdered Chlorowax 70 dissolved in 10.9 parts of dimethylformamide. A clear lustrous film prepared as described above is self-extinguishing in the AATCC 45° angle burning test.

We claim:

1. A composition of matter consisting essentially of
   a. an ester of pentavalent antimony with a polyhydroxy compound containing two through six carbon atoms and having vicinal hydroxyl groups, four of the valences of the antimony being satisfied by ester linkages between the antimony and the vicinal hydroxyl groups of two molecules of the polyhydroxy compound and the fifth valence of the antimony being satisfied by an ester linkage between the antimony and a vicinal hydroxyl group of a third molecule of the polyhydroxy compound, in combination with
   b. in an ester of trivalent antimony with a polyhydroxy compound containing two through six carbon atoms and having vicinal hydroxyl groups, two of the valences of the antimony being satisfied by an ester linkage between the antimony and the vicinal hydroxyl groups of one molecule of the polyhydroxy compound, and the third valence of the antimony is satisfied by an ester linkage between the antimony and a second molecule of the polyhydroxy compound, the proportion of the pentavalent antimony ester in the composition being 20–100 mole percent.

2. An ester of pentavalent antimony with a polyhydroxy compound containing two through six carbon atoms and having vicinal hydroxyl groups, four of the valences of the antimony being satisfied by ester linkages between the antimony and the vicinal hydroxyl groups of two molecules of the polyhydroxy compound, and the fifth valence of the antimony being satisfied by an ester linkage between the antimony and a vicinal hydroxyl group of a third molecule of the polyhydroxy compound.

3. An ester of claim 2 in which the mole ratio of polyhydroxy compound to antimony is 3:1.

4. An ester of claim 3 in which the polyhydroxy compound is ethylene glycol.

5. A compound of the formula:

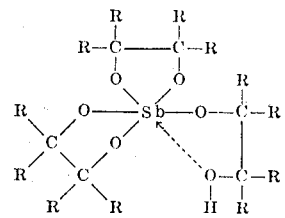

wherein each R is selected from the group consisting of hydrogen, alkyl of one through four carbon atoms, and hydroxyalkyl of one through four carbon atoms, with the proviso that the total number of carbon atoms in the R groups attached to any two bonded carbon atoms does not exceed four.

6. A solid compound of claim 5 which is:

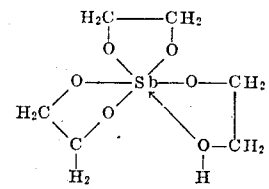

7. A solution of at least one ester of claim 2 in a polar organic solvent having a dielectric constant measured at 25° C. and $10^4$ to $10^5$ cps. greater than 35 ESU and a ratio of carbon atoms to hetero atoms less than 1.7.

8. A solution of claim 7 in which the solvent is one or more members of the group consisting of formic acid, formamide, methylformamide, dimethylformamide, acetamide, ethylene glycol, glycerol, diethylene glycol, 1,3-propanediol, 1,2-propanediol and dimethylsulfoxide.

9. A solution of claim 7 in which the solvent is selected from dimethylformamide and dimethylsulfoxide.

10. A solution of a compound of claim 6 in dimethylformamide having an NMR spectrum with a singlet at 3.70 δ where δ, in parts per million, is defined by the equation $$\delta \text{ (p.p.m.)} = \frac{\Delta \times 10^6}{\text{Oscillator frequency, c./s.}}$$

where Δ is the distance of the absorption peak from that of tetramethylsilane in cycles per second.

11. A mixed ester composed of:
  a. an ester of pentavalent antimony with a polyhydroxy compound containing two through six carbon atoms and having vicinal hydroxyl groups, four of the valences of the antimony being satisfied by ester linkages between the antimony and the vicinal hydroxyl groups of two molecules of the polyhydroxy compound and the fifth valence of the antimony being satisfied by an ester linkage between the antimony and the vicinal hydroxyl group of a third molecule of the polyhydroxy compound and
  b. an ester of trivalent antimony with a polyhydroxy compound containing two through six carbon atoms and having vicinal hydroxyl groups, two of the valences of the antimony being satisfied by an ester linkage between the antimony and the vicinal hydroxyl groups of one molecule of the polyhydroxy compound and the third valence of the antimony being satisfied by an ester linkage between the antimony and a vicinal hydroxyl group of a second molecule of the polyhydroxy compound,
the mole ratio of trivalent to pentavalent antimony in the mixed ester being less than 4:1.

12. A mixed ester of claim 11 wherein the ratio of trivalent to pentavalent antimony in the mixed ester is less than 2:1.

13. A mixed ester composed of:
  a. a compound of the formula:

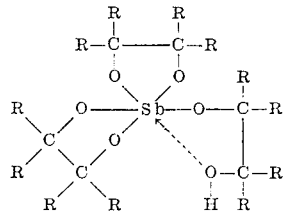

wherein each R is selected from the group consisting of hydrogen, alkyl of one through four carbon atoms and hydroxyalkyl of one through four carbon atoms with the proviso that the total number of carbon atoms in the R groups attached to any two bonded carbon atoms does not exceed four,
in combination with
  b. an ester of trivalent antimony with a polyhydroxy compound containing two through six carbon atoms and having vicinal hydroxyl groups, two valences of the antimony being satisfied by ester linkages between the antimony and the vicinal hydroxyl groups of a single molecule of the polyhydroxy compound and the third valence of the antimony being satisfied by an ester linkage between the antimony and a vicinal hydroxyl group of a second molecule of the polyhydroxyl compound,
the mole ratio of trivalent to pentavalent antimony in the mixed ester being less than 4:1.

14. A solution of at least 1 mixed ester of claim 11 in a polar organic solvent having a dielectric constant measured at 25° C. and $10^4$ to $10^5$ cps. greater than 35 ESU and the ratio of carbon atoms to heteroatoms less than 1.7.

15. A solution of claim 14 in which the solvent is one or more members of the group consisting of formic acid, formamide, methylformamide, dimethylformate, acetamide, ethylene glycol, glycerol, diethylene glycol, 1,3-propanediol, 1,2-propanediol and dimethylsulfoxide.

16. A solution of claim 14 in which the solvent is selected from dimethylformamide and dimethylsulfoxide.

17. A method of making a composition of matter consisting essentially of:
  b. an ester of trivalent antimony with a polyhydroxy compound containing two through six carbon atoms and having vicinal hydroxyl groups, two of the valences of the antimony being satisfied by an ester linkage between the antimony and the vicinal hydroxyl groups of one molecule of the polyhydroxy compound, and the third valence of the antimony is satisfied by an ester linkage between the antimony and a second molecule of the polyhydroxy compound, the proportion of the pentavalent antimony ester in the composition being 20–100 mole percent,
which comprises adding hydrogen peroxide to either (1) a slurry of antimony trioxide in the aliphatic polyhydroxy compound or (2) a solution of an ester of trivalent antimony with the polyhydroxy compound and oxidizing at least 20 mole percent of the antimony to the pentavalent state.

18. Method of claim 17 wherein the hydrogen peroxide is added to a solution of an ester of trivalent antimony with the polyhydroxy compound.

19. Method of claim 18 wherein the hydrogen peroxide is added to the solution maintained at a temperature in the range of 25° to 200° C., and water is removed by distillation, whereby there is formed a solution of the ester or mixed esters in excess polyhydroxy compound.

20. A method of making a solution of the composition of claim 1 which comprises:
  1. mixing antimony trioxide with an excess of an aliphatic polyhydroxy compound containing two through six carbon atoms and having vicinal hydroxyl groups;
  2. heating the mixture to a temperature in the range of about 125° to 240° C. to cause reaction of the antimony trioxide with the polyhydroxy compound, with removal of the water of reaction by distillation, whereby there is formed a solution of an ester of trivalent antimony with the polyhydroxy compound, dissolved in excess polyhydroxy compound;
  3. adding hydrogen peroxide to the solution while maintaining a temperature in the range of about 25° to 200° C. to oxidize at least 20 mole percent of the antimony to the pentavalent state, with removal of water of reaction by distillation under reduced pressure, whereby there is formed a solution of an ester of pentavalent antimony or a mixed ester of trivalent and pentavalent antimony with the polyhydroxy compound, dissolved in excess polyhydroxy compound.

21. Method of claim 20 wherein the temperature in step (2) is in the range of 135° to 180° C. and the temperature in step (3 is in the range of 90° to 170° C.

22. A method of making a solution of an ester of claim 2 which comprises:
  1. mixing antimony trioxide with an excess of an aliphatic diol containing two through six carbon atoms and having vicinal hydroxyl groups;
  2. heating the mixture to a temperature in the range of about 135°–180° C. to cause reaction of the antimony trioxide with the diol, with removal of the water of reaction by distillation, whereby there is formed a solution of an ester of trivalent antimony with the diol, dissolved in excess diol;
  3. adding hydrogen peroxide to the solution while maintaining a temperature in the range of about 90° to 170° C. to oxidize at least 60 mole percent of the antimony to the pentavalent state, with removal of water of reaction by distillation under reduced pressure, whereby there is formed a solution of an ester of pentavalent antimony or a mixed ester of trivalent and pentavalent antimony with the diol, dissolved in excess diol;
  4. removing excess diol by distillation under reduced pressure, until the pentavalent antimony ester of the diol crystallizes from the solution.

23. Method of claim 21 wherein the polyhydroxy compound is selected from the group consisting of ethylene glycol and glycerol.

24. Method of claim 22 wherein the diol is ethylene glycol.

25. Method of claim 24 wherein in step (3) substantially all of the antimony is oxidized to the pentavalent state.

26. Method of claim 25 wherein in step (4) the crystallized slurry is diluted with tetrahydrofuran and the crystallized product is recovered by filtration, washed with tetrahydrofuran, and dried.

* * * * *

UNITED STATES PATENT OFFICE
CERTIFICATE OF CORRECTION

Patent No. 3,676,477    Dated July 11, 1972

Inventor(s) DONG M. CHAY; CHARLES CARMEN CUMBO; MICHAEL J. RANDOLPH; PAUL C. YATES It is certified that error appears in the above-identified patent and that said Letters Patent are hereby corrected as shown below:

Claim 1, Column 14, line 5, delete "in".

Claim 17, insert the following after "consisting essentially of:" and before part "b" of the claim:

--a. an ester of pentavalent antimony with a polyhydroxy compound containing 2 through 6 carbon atoms and having vicinal hydroxyl groups, four of the valences of the antimony being satisfied by ester linkages between the antimony and the vicinal hydroxyl groups of two molecules of the polyhydroxy compound and the fifth valence of the antimony being satisfied by an ester linkage between the antimony and a vicinal hydroxyl group of a third molecule of the polyhydroxy compound, in combination with--.

Claim 21, Column 16, line 41, after "(3", insert --)-- to close the parentheses.

Signed and sealed this 10th day of July 1973.

(SEAL)
Attest:

EDWARD M. FLETCHER, JR.
Attesting Officer

Rene Tegtmeyer
Acting Commissioner of Patents